United States Patent
Pereira et al.

(10) Patent No.: US 6,640,861 B2
(45) Date of Patent: *Nov. 4, 2003

(54) TIRE CROWN REINFORCEMENT WITH SPECIFIED RUBBER BONDING LAYERS

(75) Inventors: Pedro Costa Pereira, Clermont-Ferrand (FR); Yves Herbelleau, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/823,543

(22) Filed: Mar. 30, 2001

(65) Prior Publication Data

US 2001/0013386 A1 Aug. 16, 2001

Related U.S. Application Data

(63) Continuation of application No. PCT/EP99/07264, filed on Oct. 1, 1999.

(30) Foreign Application Priority Data

Oct. 2, 1998 (FR) .............................. 98 12593

(51) Int. Cl.$^7$ .............................. B60C 9/18; B60C 9/20
(52) U.S. Cl. ........................ 152/532; 152/526; 152/537
(58) Field of Search ................ 152/537, 532, 152/526

(56) References Cited

U.S. PATENT DOCUMENTS

| | | | | |
|---|---|---|---|---|
| 2,541,506 A | * | 2/1951 | Cuthbertson et al. | 152/532 X |
| 3,231,000 A | * | 1/1966 | Massoubre | 152/537 X |
| 3,392,774 A | | 7/1968 | LeBosse | |
| 4,140,166 A | * | 2/1979 | Koyama et al. | 152/537 |
| 4,425,953 A | | 1/1984 | Rohde et al. | |
| 4,795,523 A | | 1/1989 | Laurent et al. | |
| 4,804,436 A | | 2/1989 | Debroche et al. | |
| 4,838,330 A | | 6/1989 | Takayama | |
| 4,895,692 A | | 1/1990 | Laurent et al. | |
| 4,963,207 A | | 10/1990 | Laurent | |
| 5,779,828 A | * | 7/1998 | Okamoto | 152/537 X |
| 2000/0020507 | * | 9/2001 | Pereira et al. | 152/526 |

FOREIGN PATENT DOCUMENTS

| | | | |
|---|---|---|---|
| EP | 0066225 | 12/1982 | |
| EP | 0401444 | 12/1990 | |
| EP | 0760296 | 3/1997 | |
| EP | 0 865 942 A2 | * 9/1998 | 152/537 |
| GB | 1462656 | 1/1977 | |

OTHER PUBLICATIONS

English–language Abstract for JP 60015203 (Jan. 25, 1985), Bridgestone Corp.
English–language Abstract for JP 05319016 (Mar. 12, 1993), Bridgestone Corp.
Patents Abstract of Japan for JP 07186614, Jul. 25, 1995, Toichi, Bridgestone Corp.
Mechanics of Pneumatic Tires, Samuel K. Clark, ed., U.S. Department of Transportation, Aug. 1981, p27.

* cited by examiner

Primary Examiner—Adrienne C. Johnstone
(74) Attorney, Agent, or Firm—Baker Botts L.L.P.

(57) ABSTRACT

A tire having a crown, two sidewalls and two tire beads, a carcass reinforcement anchored in the two tire beads and a belt reinforcement, said belt reinforcement including at least two superposed reinforcement plies formed with cords parallel in each ply and criss-crossed from one ply to the other forming with the circumferential direction angles ($\alpha$, $\beta$) ranging between 10° and 55° and characterized in that the cords of at least one of the two reinforcing plies are successively in contact, on the same side of said ply, moving from the tire equatorial plane towards one of the reinforcing ply lateral ends with a rubber bonding layer having a first modulus of elasticity and then a rubber bonding layer of a second modulus of elasticity lower than the first.

18 Claims, 7 Drawing Sheets

TIRE CROWN REINFORCEMENT WITH SPECIFIED RUBBER BONDING LAYERS

This is a continuation of pending application PCT/EP99/07264, filed Oct. 1, 1999.

BACKGROUND OF THE INVENTION

The invention concerns the crowns of tires and, more particularly, the rubber bondings in contact with the reinforcing cords of those crowns.

The crowns of tires usually comprise a carcass reinforcement, a belt reinforcement with usually at least two superposed reinforcing plies formed by cords parallel in each ply and criss-crossed from one ply to the other and a tread.

It is well known that under harsh conditions of use, as the distances covered increase, fissures can appear at the lateral end of the cords of the crown reinforcing plies. Those fissures can then be propagated along the cords and be joined together between two or more cords and thus result in a separation of the lateral ends of the two crown reinforcing plies.

To limit the initiation and propagation of those fissures, bands of rubbery compound of lower modulus of elasticity than that of the rubber bonding layers of the crown plies are usually inserted between the ends of the reinforcing plies.

SUMMARY OF THE INVENTION

The object of the invention is a tire whose crown structure is capable of containing the phenomena of separation of the lateral ends of the crown reinforcing plies and of reducing their appearance to stress levels affording an even greater margin of safety.

In what follows, "cord" is understood to mean monofilaments as well as multifilaments, or assemblages like cables, yarns or even any type of equivalent assemblage, whatever the material and treatment of those cords, the term cord embracing any type of surface covering or coating, notably of rubber having undergone the start of vulcanization or pre-sizing to promote adherence to the unvulcanized rubber.

"Rubber bonding layer" for a given reinforcing ply is understood to mean the rubbery compound in contact with the ply reinforcing cords, adhering to the latter and filling the interstices between adjacent cords. In current industrial practice, for a given crown or carcass reinforcing ply, the same rubber bonding composition is used for the different zones of the tire.

"Contact" between a cord and a rubber bonding layer is understood to mean that at least one part of the outer circumference of the cord is in close contact with the rubbery compound constituting the rubber bonding. If the cord contains a covering or coating, the term contact means that the outer circumference of that covering or coating is in close contact with the rubbery compound constituting the rubber bonding.

"Modulus of elasticity" of a rubbery compound is understood to mean a secant extension modulus obtained on a uniaxial extension deformation in the order of 100% after two cycles of accommodation to that deformation amplitude and at ambient temperature.

The tire according to the invention comprises a crown, two sidewalls and two beads, a carcass reinforcement anchored in the two beads and a belt reinforcement, the belt reinforcement comprising at least two superposed reinforcing plies formed by cords parallel in each ply and criss-crossed from one ply to the other by forming angles ($\alpha$, $\beta$) with the circumferential direction ranging between 10° and 55°. The tire is characterized in that the cords of at least one of the two reinforcing plies are successively in contact, on the same side of said ply, by axially following the equatorial plane of the tire to at least one of the lateral ends of the reinforcing ply, with at least one rubber bonding layer of a first modulus of elasticity and then a rubber bonding layer of a second modulus of elasticity less than the first.

The rubber bonding layer of modulus of elasticity less than that of the rubber bonding layer placed in the central part of the crown has the advantage of better withstanding fissuring in the lateral end zones of markedly stressed reinforcing plies.

According to a first embodiment, the axial widths of the two crown reinforcing plies being different, the cords in contact with the rubber bonding layers of a first and a second modulus of elasticity are the cords of the reinforcing ply whose axial width L is smallest and the said rubber bonding layers of a first and a second modulus of elasticity are placed radially on the side of the second crown reinforcing ply.

That embodiment has the advantaging of appreciably diminishing the maximum shear stresses between the two plies, which is very favorable for limiting fissuring phenomena.

According to a second embodiment, the rubber bonding layers of a first and a second modulus of elasticity are placed radially between the two crown reinforcing plies and are each in contact with the cords of the two reinforcing plies.

That embodiment has the advantage of limiting to one the number of rubber bonding layers placed radially between the two reinforcing plies, which facilitates manufacture of the tire.

The cords of at least one of the axial ends of the crown reinforcing ply whose axial width is smallest are preferably in contact, radially on both sides of said ply, with the said rubber bonding layer of a second modulus of elasticity.

The cords of the axial ends of the two crown reinforcing plies, placed at least on a same side of the equatorial plane, can also be in contact, radially on both sides of those plies, with the rubber bonding layer of a second modulus of elasticity.

A rubber decoupling layer of a third modulus of elasticity can, furthermore, be placed between the axial ends of the said crown reinforcing plies, on one side at least of the equatorial plane and in which the third modulus of elasticity is less than the second modulus of elasticity.

Those variants strengthen the resistance to fissuring at the end of the cords of the crown plies.

The axial width of the zones of contact between a rubber bonding layer of a second modulus of elasticity and the cords of a reinforcing ply is greater than 5% of the axial half-width of the reinforcing ply. It is not necessary for it to be greater than 30% of that axial half-width.

In addition, the cords of the radially outer reinforcing ply are in contact, at least in the center zone of that ply, on the radially outer side, with a rubber bonding layer of a fourth modulus of elasticity. The fourth modulus of elasticity is less than the first modulus of elasticity.

That arrangement is particularly advantageous when the belt reinforcement comprises a third reinforcing ply placed radially outside the two crossed reinforcing plies. That third reinforcing ply can consist of reinforcing plies oriented in the circumferential direction of the tire.

The ratio between the second modulus of elasticity and the first modulus of elasticity ranges between 0.5 and 0.9 and preferably between 0.6 and 0.8. The first modulus of elasticity can range between 9 and 13 MPa.

The third modulus of elasticity can range between 3 and 6 MPa and the fourth between 3 and 8 MPa.

According to one advantageous arrangement, the rubber bonding layers extend axially outward beyond the axial end of the cords of the crown plies.

According to another embodiment, the cords of at least one of the reinforcing plies are in contact, in the center part of the crown, with an additional rubber bonding layer of a fifth modulus of elasticity higher than the first modulus of elasticity. That fifth modulus of elasticity can range between 12 and 20 MPa.

This embodiment is particularly advantageous when the belt reinforcement does not contain any reinforcing ply composed of cords oriented in the circumferential direction of the tire. In that case, the rigidity of the rubber bondings in the center part of the crown contributes appreciably to the overall rigidity of the crown and contributes to obtaining excellent road performance characteristics of vehicles equipped with such tires.

Advantageously, the cords of one of the crown plies having a diameter ϕ, any rubber bonding layer of a second modulus of elasticity in contact with those cords has a thickness opposite the cords, at least in the lateral end zone of that crown ply, greater than or equal to ϕ/2. That minimum thickness appreciably improves resistance to fissuring of the crown of tires according to the invention. In the case of vehicles subjected to intense running stresses, it is desirable for that minimum thickness to be greater than or equal to ϕ.

DESCRIPTION OF PREFERRED EMBODIMENTS

Figures 1, 1A:
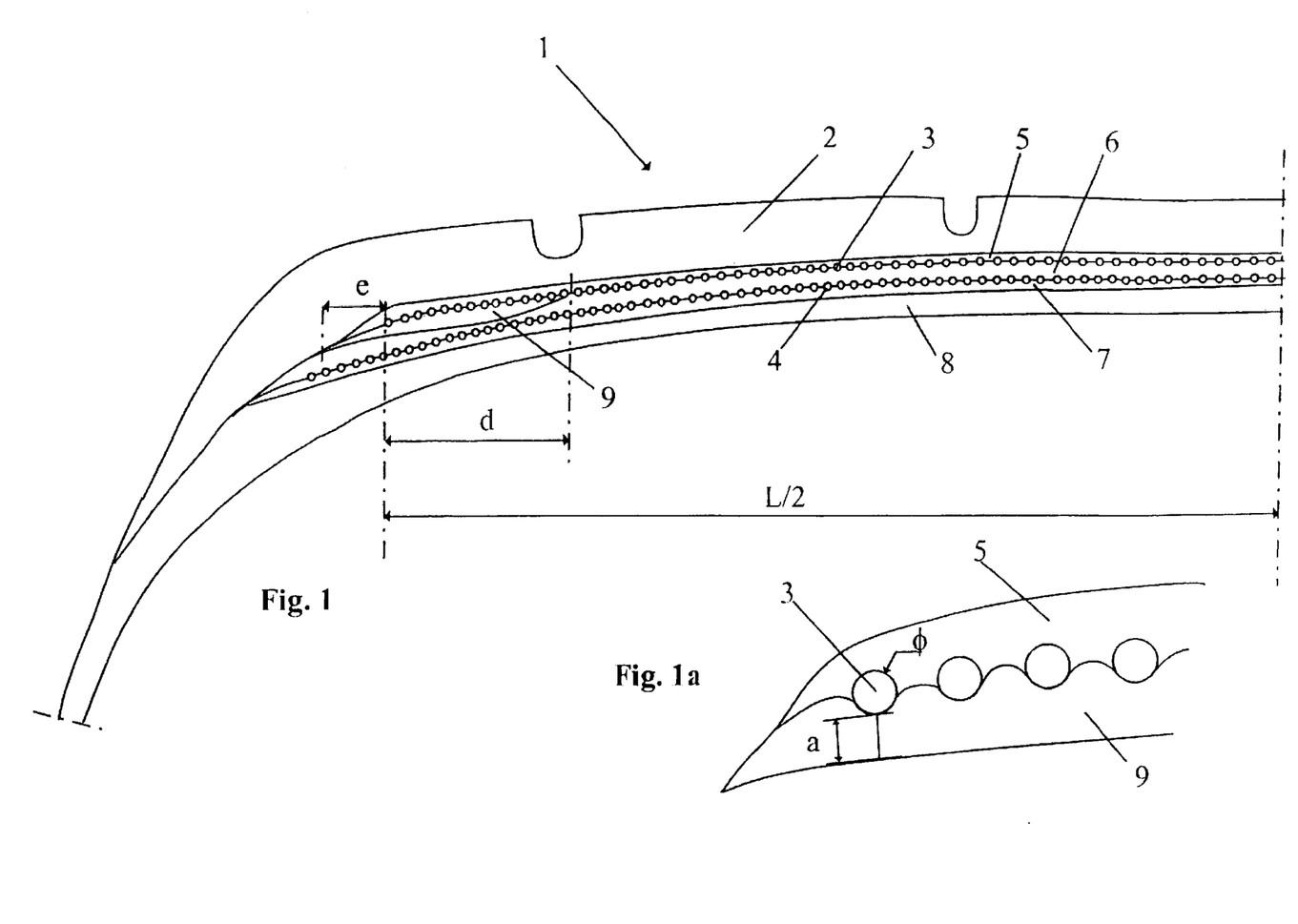
FIG. 1 presents in partial meridian section a first embodiment of a radial tire crown according to the invention.
FIG. 1a represents an enlargement of the section of FIG. 1.

In FIG. 1, a first embodiment of a tire crown according to the invention is presented schematically in partial meridian section. That crown 1 comprises, notably, a tread 2 and two crown reinforcing plies 3 and 4. Those two plies are superposed and consist of cords parallel in each ply and crisscrossed from one ply to the other by forming angles (α, β) with the circumferential direction ranging between 10 and 55°. The cords of ply 3 are in contact, on the radially outer side, with the rubber bonding layer 5 and, on the radially inner side, with two rubber bonding layers, layer 6 in the central part of the ply and layer 9 at the lateral end of the ply. The cords of ply 4 are in contact, on the radially outer side, with rubber bonding layer 6 and, on the radially inner side, with another rubber bonding layer, layer 7. Radially underneath rubber bonding layer 7, in the zone referenced 8, the crown 1 contains, notably, a radial carcass reinforcement not represented.

Plies 3 and 4 are formed exclusively by cords arranged so that they have no contact with each other. For example, the cords of ply 3 are in contact with layers 5, 6 and 9. Layer 5 is in contact between the cords with layer 6, in the central part of the crown, and with layer 9 in the lateral part of the crown.

In the central part of the crown, there is then a single rubber bonding layer 6. That layer is directly in contact with the cords of the two crown reinforcing plies 3 and 4. That rubber bonding layer has usually a modulus of elasticity ranging between 9 and 13 MPa.

In the lateral part of the crown, the cords of ply 3, the axial width L of which is less than that of ply 4, are in contact with a second rubber bonding layer 9 of modulus of elasticity less than that of the first layer. The ratio of moduli ranges preferably between 0.6 and 0.8. That layer of lower modulus limits the amplitude of the maximum shear stresses and promotes good resistance to the propagation of fissures between the two plies.

Rubber bonding layers 5 and 7 can usually be rubber compounds of the same composition as layer 6. Layer 6 can also be of a modulus higher than that of layers 5 and 7, in order to make it possible to increase the drift rigidity of the crown, if necessary.

The axial width of the zone of contact between layer 9 and the cords of ply 3 ranges between 5 and 30% of the axial half-width L/2 of ply 3. Below 5%, the effect of layer 9 is practically no longer perceptible, and beyond 30% the properties of rigidity of the crown and thus of drill thrust can be affected. Furthermore, the rubber bonding layers are extended axially beyond the cords of plies 3 and 4. By way of example, layer 9 is extended by an axial distance e equal to or exceeding 3 mm.

Possible additional reinforcing or protecting plies are not represented in FIG. 1 nor in the following ones.

FIG. 1a is an enlargement of the lateral end of ply 3. The cords of that ply have a diameter ϕ and are in contact radially outside with layer 5 and radially inside with layer 9. That figure shows the thickness a of layer 9 opposite the last cord of ply 3. That thickness a must always be greater than ϕ/2 and even, in the case of tires for commercial vehicles, greater than ϕ. As layer 9 extends axially outside that last cord, the latter is very closely surrounded by the compound constituting the bonding layer 9 on the radially inner side, directed toward the second reinforcing ply 4. The diameter of a wire of a crown reinforcing ply is in the order of 0.8 to 1.5 mm in the case of passenger car tires and in the order of 1.5 to 1.8 mm in the case of tires for commercial vehicles.

Figures 2, 2A:
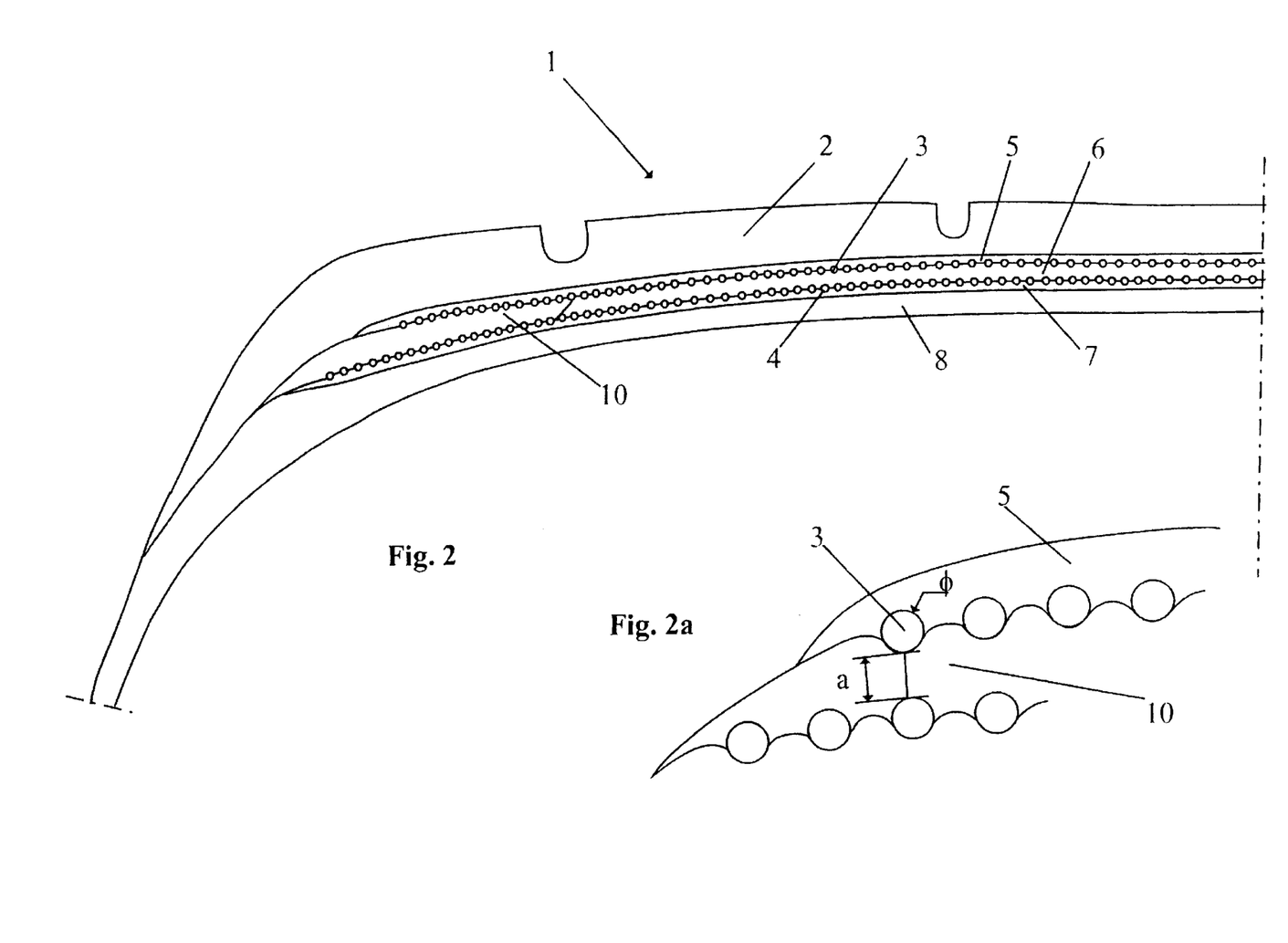
FIG. 2 presents in partial meridian section a second embodiment of a tire crown according to the invention.
FIG. 2a represents an enlargement of the section of FIG. 2.

FIG. 2 presents, similar to FIG. 1, a working variant of the crown according to the invention. In this variant, a rubber bonding layer 10 is placed at the lateral end of the two plies 3 and 4 and is in contact with the cords of those two plies. The bonding zone of the two layers 10 and 6 between the two plies 3 and 4 is preferably beveled.

That variant has effects substantially similar to those of the previous one, but has the advantage of being easier to use.

FIG. 2a is an enlargement of the lateral end of plies 3 and 4. It can be seen that the minimum thickness a of the bonding layer 10 opposite the last cord of layer 3 corresponds roughly to the radial distance between two cords. That distance should also be greater than the radius φ/2 and even φ.

Figure 3:
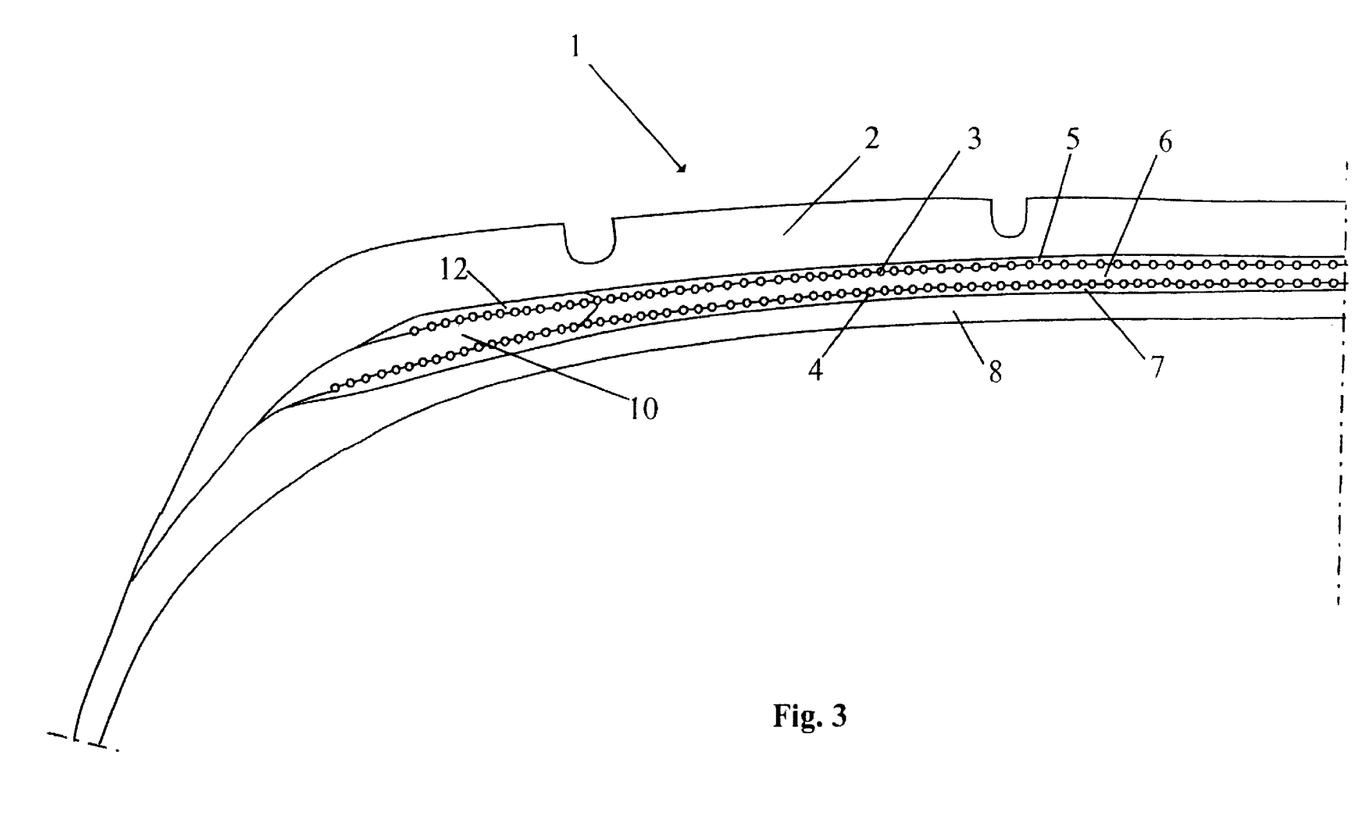
FIG. 3 presents in partial meridian section a third embodiment of a tire crown according to the invention.

In FIG. 3, a third variant is presented. In the latter, the cords of ply 3 are in contact, on the radially outer side, with the rubber bonding layer 5 in the center zone of the tire and with a rubber bonding layer 12 at the lateral end of ply 3. The rubber bonding layer 12 has the same modulus of elasticity as that of layer 10. As the rubber bonding layers 10 and 12 extend axially beyond the end of the cords over several millimeters, and at least 3, those cords of the axial end of ply 3 are surrounded in all directions by a rubber bonding layer of second modulus of elasticity. The thickness of those rubber bonding layers of second modulus of elasticity, opposite the last cords of plies 3 and 4, is greater than φ/2 and even φ.

The diameter φ of a wire is determined by application of standard ASTM D2969 with the aid of a micrometer. In the case of textile yarns, the determination is made according to the following procedure. The yarn being taut, it intersects a parallel beam of light. The shadow cast on a photoreceptor diode strip is measured instantly. The result of a measurement is the average width of the shadow, determined at 900 points on 50 cm of yarn. The diameter φ is calculated by taking the average of 4 measurements.

Figure 4:
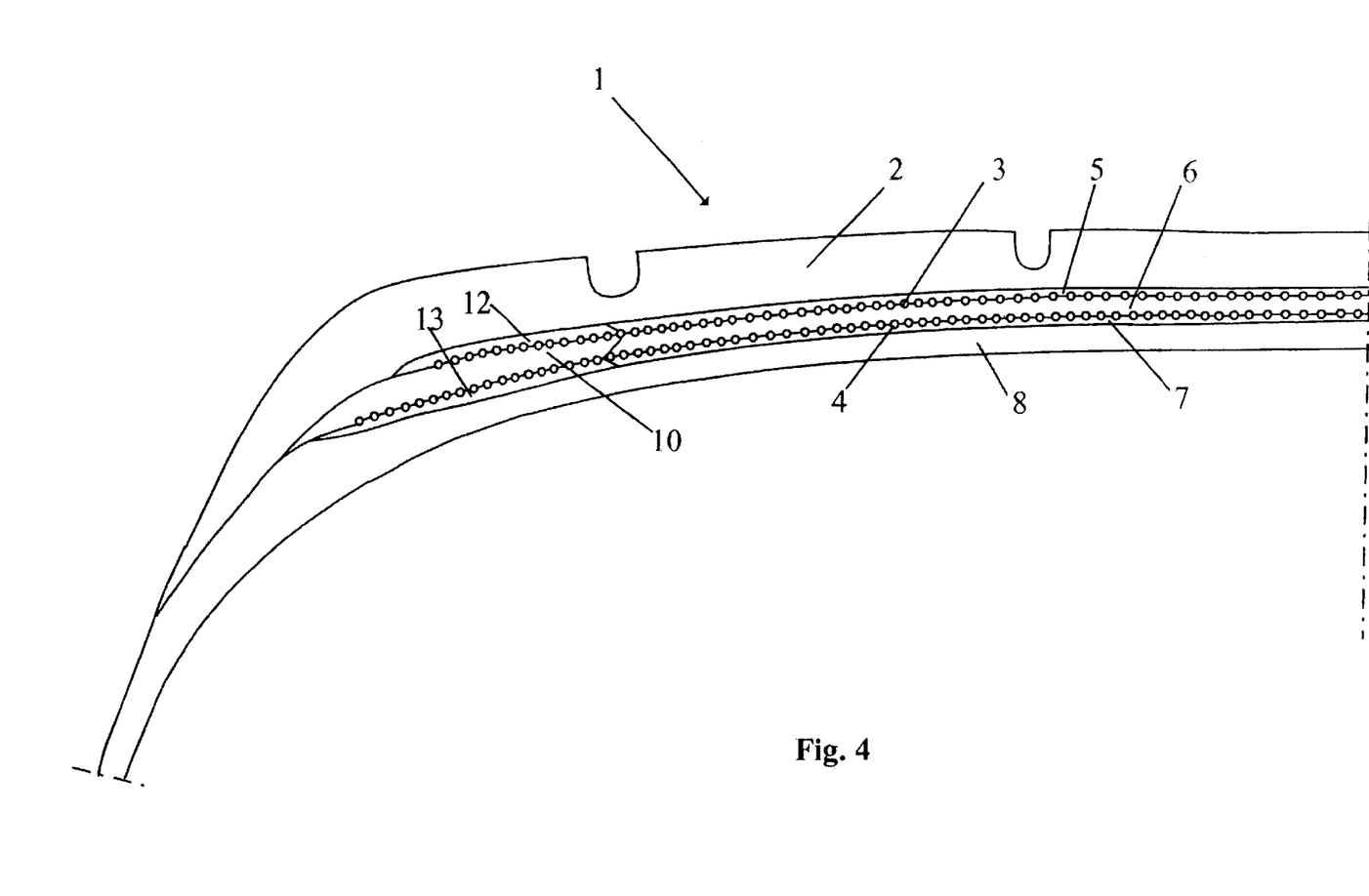
FIG. 4 presents in partial meridian section a fourth embodiment of a tire crown according to the invention.

In FIG. 4, the cords of ply 4 are in contact, on the radially inner side, with the rubber bonding layer 7 in the center zone of the tire and with a rubber bonding zone 13 at the lateral end of ply 4. The layers 10, 12 and 13 have the same modulus of elasticity, less than that of layer 6. The cords of the axial ends of plies 3 and 4 in that variant are all surrounded in every direction by a rubber bonding layer of second modulus of elasticity. The thickness of that layer, at least opposite the last cords of plies 3 and 4, is also greater than the radius and even the diameter of the cords in order to guarantee good endurance of the tire crown.

Figure 5:
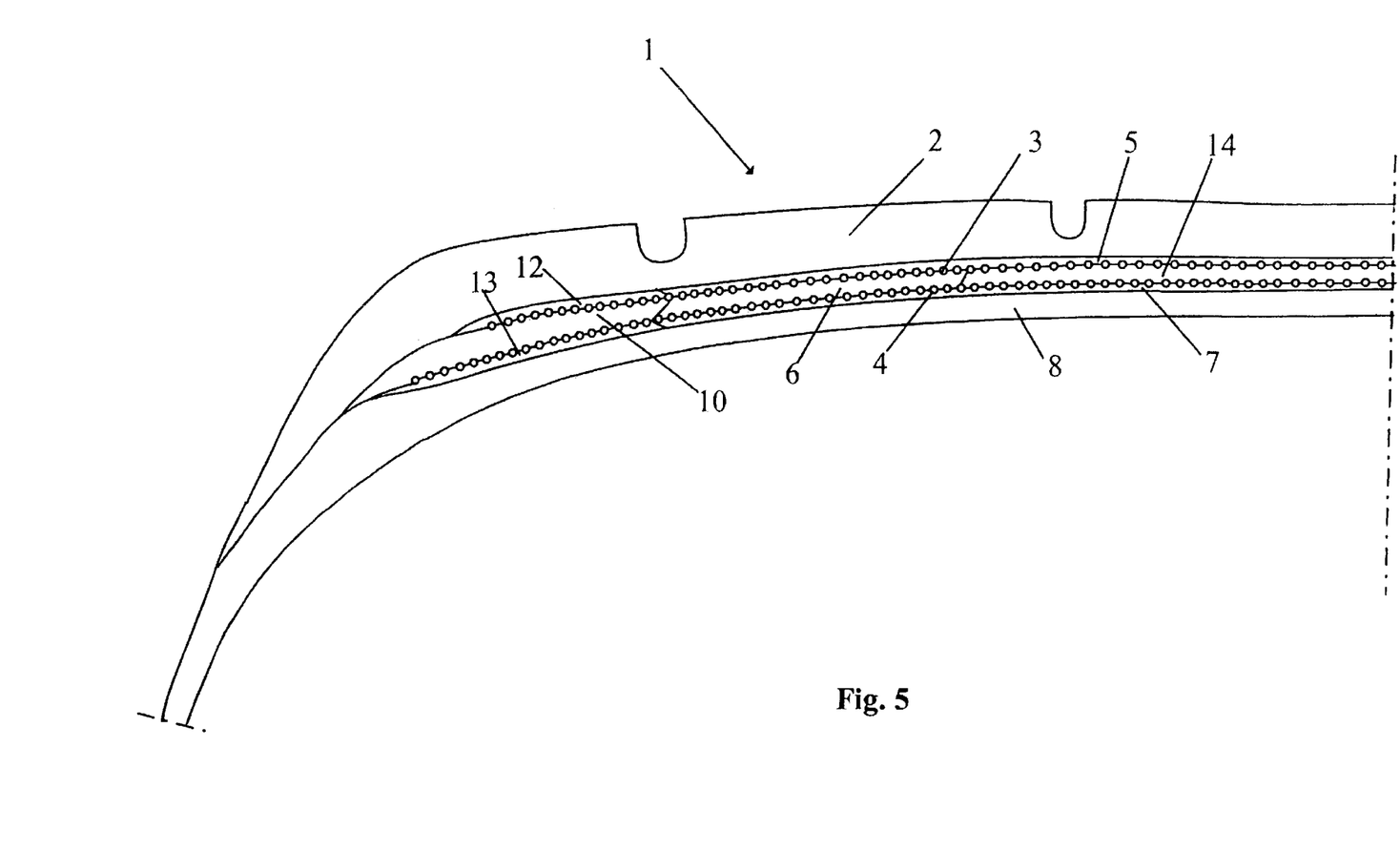
FIG. 5 presents in partial meridian section a fifth embodiment of a tire crown according to the invention.

In FIG. 5, the center part of the crown comprises, between plies 3 and 4, a rubber bonding layer 14 of high modulus of elasticity intended to increase the rigidity of the crown. That variant has the advantage of increasing the drift thrust of the tire without impairing its resistance to fissuring at the end of the cords of the reinforcing plies.

Figure 6:
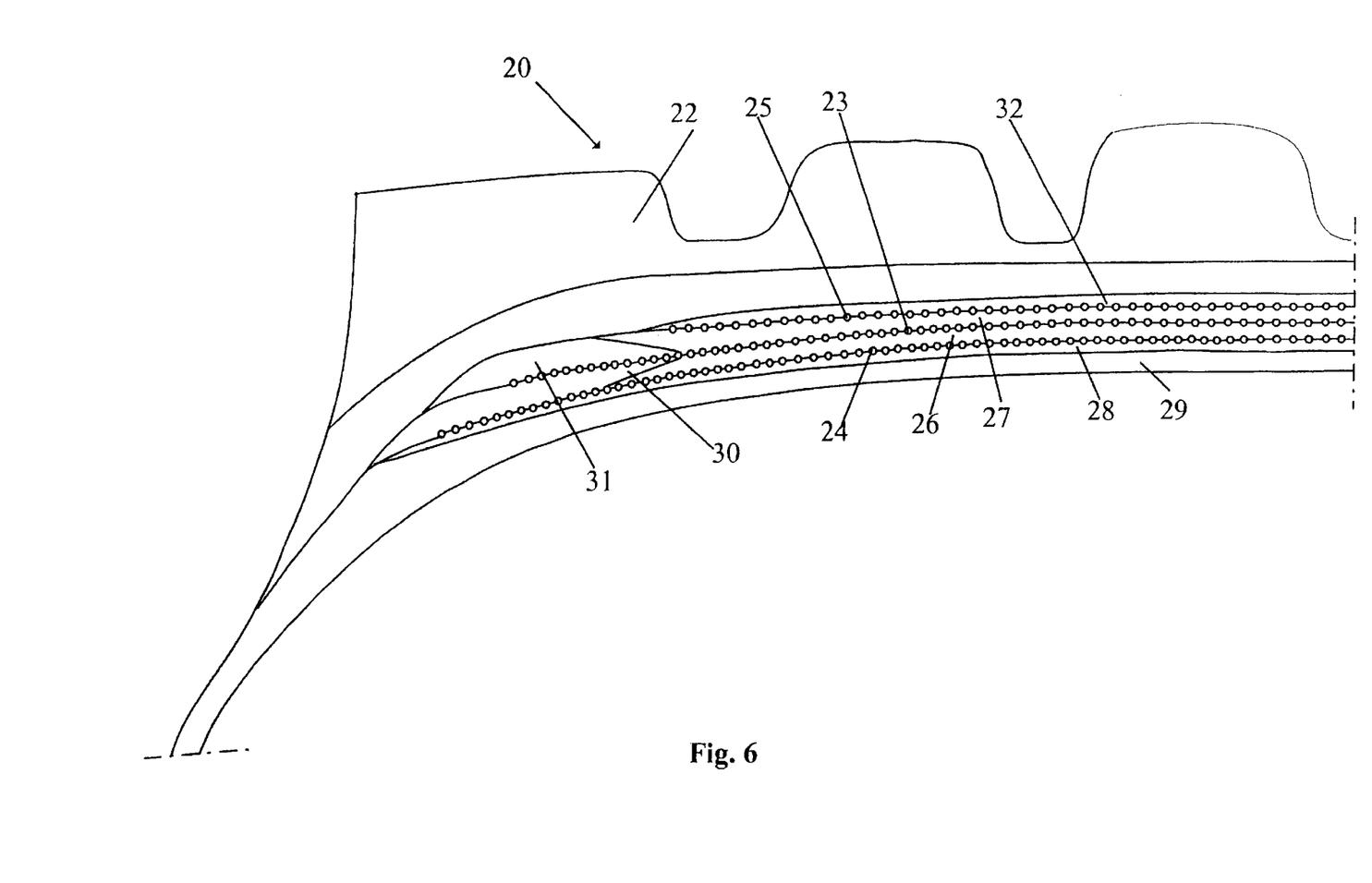
FIG. 6 presents in partial meridian section a sixth embodiment of a tire crown according to the invention.

In FIG. 6, a tire crown 20 particularly designed to equip commercial vehicles is presented. As previously, the crown 20 comprises, radially from inside out, notably a carcass reinforcement not represented in the zone referenced 29, and two superposed and criss-crossed crown reinforcing plies 24 and 23 as well as their rubber bondings 28, 26 and 30 for ply 24 and 26, 30, 27 and 31 for ply 23. The crown further comprises a third reinforcing ply 25, the cords of which are oriented in the circumferential direction. That third ply is in contact radially inside with rubber bonding layer 27 and outside with layer 32. Those two layers 27 and 32 advantageously have a modulus of elasticity ranging between 3 and 8 MPa.

Figure 7:
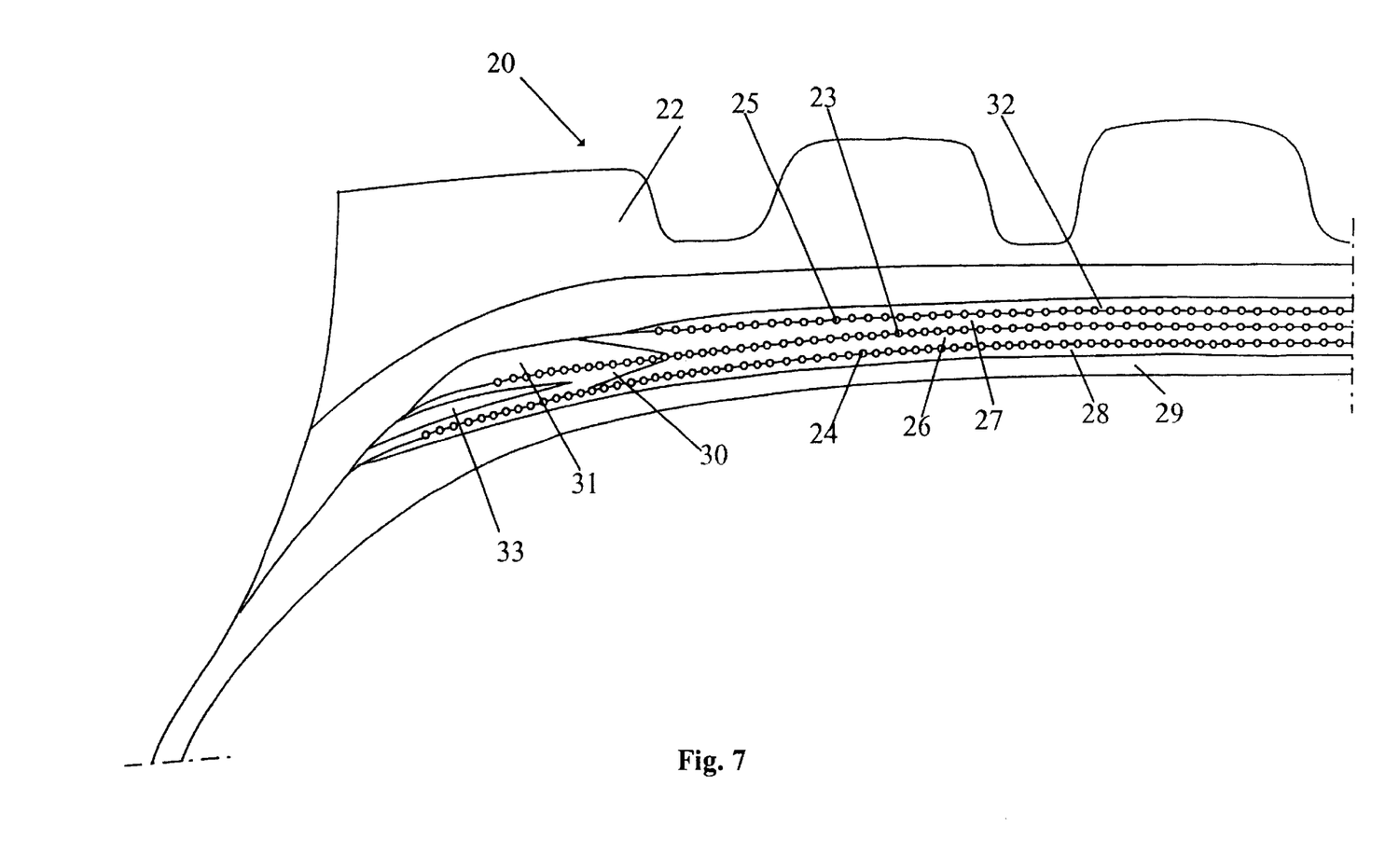
FIG. 7 presents in partial meridian section a seventh embodiment of a tire crown according to the invention.

FIG. 7 presents a last embodiment of a crown according to the invention. In the latter, a rubber decoupling layer 33 has been placed between the ends of the two reinforcing plies 23 and 24. That layer 33 has a low modulus of elasticity, ranging between 3 and 6 MPa, which is less than that of layers 30 and 31.

That layer 33 can be placed advantageously between the ends of the crown reinforcing plies of all the tire crown embodiments according to the invention.

The 315/70 R 22.5 tires were made with the following configurations:

Control: tire in which the rubber bonding layers extended over the whole axial width of the crown reinforcing plies;

A: tire incorporating the solution presented in FIG. 3: the two lateral ends of ply 3 are in contact, radially inside and outside, with two rubber bonding layers 10, 12 of modulus of elasticity equal to 7 MPa, the modulus of elasticity of layer 6 being equal to 11 MPa;

B: tire incorporating the solution presented in FIG. 4: the lateral ends of the two plies 3 and 4 are in contact, radially inside and outside, with rubber bonding layers of modulus equal to 7 MPa, the modulus of elasticity of layer 6 being equal to 11 MPa;

C: tire similar to tire B, further incorporating the solution presented in FIG. 7, that is, a rubber bonding layer of very low modulus of elasticity 33 is placed between the lateral ends of the two plies; that layer 33 has a modulus of elasticity of 5 MPa.

Those tires were tested running in a straight line.

Relative to the control, solution A presents a substantial improvement in lifetime of approximately 10%. One also finds that the working temperatures reached in the lateral part of the tire crown are less than those of the control. That is due to the fact that the compounds of lower modulus of elasticity also have a lower hysteresis and thus the energy dissipated is less on rolling.

Solution B contributes a gain in lifetime similar to that of solution A. It is to be noted that the presence of the rubber bonding layer 13 under the lateral end of ply 4 very sharply limits the progression of fissures under that lateral end; that can prolong the service life of the tire.

Solution C is the most efficient one in terms of mileage covered by the different tires tests. The lowest working temperatures are also observed, for the same reasons as explained above.

Those tests show the importance of being able to adjust the rigidity and hysteresis of the rubber bonding layers of the two crossed crown reinforcing to the circumferential section of the tire in order to prolong the service life of the tires.

In manufacturing the different tires according to the invention, it is very advantageous to fabricate them on a rigid core setting the shape of the inner cavity. All the constituents of the tire are applied on that core, in the order required by the final architecture, being directly arranged in their final place, without undergoing shaping at any time of fabrication. That fabrication can, notably, use the devices described in patent EP 0,243,851 for laying the cords of the carcass reinforcement, EP 0,248,301 for laying the crown reinforcements and EP 0,264,600 for laying the rubbery compounds. The tire can be molded and vulcanized, as explained in U.S. Pat. No. 4,895,692.

We claim:

1. A tire comprising a crown, two sidewalls and two beads, a carcass reinforcement anchored in the two beads and a belt reinforcement, wherein the belt reinforcement comprises at least two superposed reinforcing rows formed by cords parallel in each row, wherein the cords of at least one of the two reinforcing rows are successively in contact, on the same side of the row, by axially following the equatorial plane of the tire to at least one of the lateral ends of the reinforcing row with a rubber bonding layer of a first secant modulus of elasticity at 100% elongation and then a rubber bonding layer of a second secant modulus of elasticity at 100% elongation less than the first modulus of elasticity, wherein the cords of the at least one of the two reinforcing rows are in contact, on the other side of the row, with a single rubber bonding layer, and wherein the at least two superposed reinforcing rows are formed by cords parallel in each row and criss-cross one row with respect to the other by forming angles ($\alpha$, $\beta$) with the circumferential direction ranging between 10° and 55°.

2. A tire according to claim 1, wherein the axial widths of the two reinforcing rows are different, wherein the cords in contact with the rubber bonding layers of a first and second modulus of elasticity are the cords of the reinforcing row whose axial width L is the smaller of the two, and wherein the rubber bonding layers of a first and second modulus of elasticity are placed radially on the side of the reinforcing row whose axial width is the larger of the two.

3. A tire according to claim 1, wherein the rubber bonding layers of a first and second modulus of elasticity are placed radially between the two reinforcing rows, and wherein each bonding layer is in contact with the cords of the reinforcing rows.

4. A tire according to claim 3, wherein the axial widths of the two reinforcing rows are different, wherein the cords of at least one of the axial ends of the reinforcing row whose axial width L is the smaller of the two are in contact, radially on both sides of the row, with the rubber bonding layer of a second modulus of elasticity.

5. A tire according to claim 1, wherein the axial width of each of the zones of contact between the rubber bonding layer of a second modulus of elasticity and the cords of the at least one of the two reinforcing rows is greater than 5% of the axial half-width of the reinforcing row.

6. A tire according to claim 1, wherein the axial width of each of the zones of contact between the rubber bonding layer of a second modulus of elasticity and the cords of the at least one of the two reinforcing rows is less than 30% of the axial half-width of the reinforcing row.

7. A tire according to claim 1, wherein the cords of the radially outer of the two reinforcing rows are in contact, at least in the center zone of the row, on the radially outer side, with a rubber bonding layer of a low secant modulus of elasticity at 100% elongation, and wherein the low modulus of elasticity is less than the first modulus of elasticity.

8. A tire according to claim 7, wherein the low modulus of elasticity ranges between 3 and 8 MPa.

9. A tire according to claim 1, wherein the ratio between the second modulus of elasticity and the first modulus of elasticity ranges between 0.5 and 0.9.

10. A tire according to claim 1, wherein the ratio between the second modulus of elasticity and the first modulus of elasticity ranges between 0.6 and 0.8.

11. A tire according to claim 1, wherein the first modulus of elasticity ranges between 9 and 13 MPa.

12. A tire according to claim 1, wheren the rubber bonding layers extend axially at least 3 mm outward beyond at least one of the axial ends of the cords of at least one of the two reinforcing rows.

13. A tire according to claim 1, wherein the cords of the at least one of the two reinforcing rows are in contact, in the center part of the belt, with an additional rubber bonding layer of a high secant modulus of elasticity at 100% elongation higher than the first modulus of elasticity.

14. A tire according to claim 13, wherein the high modulus of elasticity ranges between 12 and 20 MPa.

15. A tire according to claim 1, wherein the cords of the at least one of the two rows have a diameter $\phi$, and wherein any rubber bonding layer of a second modulus of elasticity in contact with the cords has a thickness, opposite the cords, at least in the lateral end zone of the row, greater than or equal to $\phi/2$.

16. A tire according to claim 1, wherein the cords of the at least one of the two rows have a diameter $\phi$, and wherein any rubber bonding layer of a second modulus of elasticity in contact with the cords has a thickness, opposite the cords, at least in the lateral end zone of the row, greater than or equal to $\phi$.

17. A tire according to claim 1, wherein a rubber layer of a third secant modulus of elasticity at 100% elongation is placed between the axial ends of the two reinforcing rows, on one side at least of the equatorial plane, and wherein the third modulus of elasticity is less than the second modulus of elasticity.

18. A tire according to claim 17, wherein the third modulus of elasticity ranges between 3 and 6 MPa.

* * * * *

UNITED STATES PATENT AND TRADEMARK OFFICE
CERTIFICATE OF CORRECTION

PATENT NO. : 6,640,861 B2
DATED : November 4, 2003
INVENTOR(S) : Pereira et al.

It is certified that error appears in the above-identified patent and that said Letters Patent is hereby corrected as shown below:

Column 8,
Line 11, "wheren" should read -- wherein --

Signed and Sealed this

Third Day of February, 2004

JON W. DUDAS
*Acting Director of the United States Patent and Trademark Office*